Patented Feb. 13, 1945

2,369,411

UNITED STATES PATENT OFFICE 2,369,411

CELLULOSE DERIVATIVES AND PROCESSES OF PREPARING THE SAME

John A. Roux, Springdale, Conn., assignor, by mesne assignments, to Rouxite Company, a corporation of South Carolina No Drawing. Application April 16, 1940, Serial No. 329,983

22 Claims. (Cl. 260—231)

This invention relates to cellulose derivatives and processes of perparing the same, and it comprises, as new materials, the product of reacting cellulose with alkalis and alkali-forming metal hypochlorites under conditions yielding a gelled "cellulose oxychloride" capable of being molded to form transparent, hardened sheets, films, and containers, it further comprises the product of reacting such gelled products with unsaturated aliphatic hydrocarbons, such products being soluble in organic solvents, and it further comprises processes by which the aforesaid products can be prepared.

In the past, many kinds of plastic materials have been made from cellulose starting materials by processes of nitration, acetylation, and xanthation. The cellulose nitrate plastics are expensive, inflammable, and are of limited utility in the arts unless colloided with camphor to form the well-known celluloid. The cellulose acetate plastics are also expensive and require the use of costly acetylating agents. The viscose type is only suitable for the formation of filaments or thin films of regenerated cellulose.

What is desired in this art is some way by which cellulose can be readily and inexpensively converted to materials which can be molded to give transparent sheets, films, and containers for food-stuffs without the necessity for using expensive cellulose derivative-forming reagents. Such products should readily transmit ultraviolet light for in such cases they can be used in place of window glass, and as far better materials for use as transparent food containers, like milk bottles. Moreover, such products should have a high degree of flexibility when such characteristic is desirable, and at the same time they should lend themselves to combination with hardening agents so that hard, transparent, glass-like products can also be made available. It is, of course, obvious that plastic products of this type should show no tendency to oxidize, decompose, or discolor under all conditions of use. The product should resist any discoloration when exposed to ultra-violet rays equal to a transmission equal to 2700 Angstrom units for 100 hours.

I have now discovered ways by which these desirable objectives can be achieved. My invention is based in part on the discovery that alpha cellulose can be made to react with hypochlorites to yield gelled, transparent materials which can be hardened under controlled conditions, and which can be molded to give sheets, films, and hollow containers. I have further discovered that these cellulose-hypochlorite reaction products can be reacted with unsaturated hydrocarbons, such as ethylene, to give "ethylated celluloses" which may, and most likely do, contain glycolate radicals as will be more fully explained. These organic derivatives of cellulose are soluble in various organic solvent mixtures from which these can be formed into films and cast into molded articles.

In order that my invention shall be clearly understood I shall divide this description into two parts, the first of which is concerned with the preparation of the "cellulose-oxychloride" reaction product, and the second of which is more particularly devoted to the reacting of such reaction product with unsaturated hydrocarbons for what can be called the "ethylation" of the reaction product.

As pointed out above, the "cellulose-oxychloride" reaction product can be used for purposes other than the ethylation thereof, and, consequently, I claim it as a new material.

It is, of course, old to subject cellulose to the action of oxidizing agents. Textbooks on the subject refer to the oxidation of cellulose with permanganates, chromic acid, and bleaching powder, and the resulting product has been haphazardly defined as an "oxy-cellulose." These old processes have been used primarily for the purpose of academically studying the constitution of cellulose. So far as I know, no useful products have ever resulted. In my search for new and useful cellulose plastic materials, I examined the so-called oxidation of cellulose in detail, and as a result of my work I have been able to set forth conditions which yield a cellulose oxychloride having properties and characteristics hitherto not realized.

In specific detail, my invention comprises reacting alpha cellulose in the presence of water (as in an ordinary paper-works beater) with calcium hypochlorite and lime under conditions which convert the cellulose to a gelled state, the gelled cellulose, while still in the beater water, is sent through a homogenizer to thoroughly break down any residual fibrous structure, the mixture is then filtered to remove a large part of the water and any materials soluble therein, the filter cake of gel is next dried to a moisture content of about .22 percent (with variations, however, as later pointed out) and then the gel is treated with carbon dioxide. The final result is a gelled material which can be molded.

More specifically, 100 pounds of alpha cellulose are suspended in 2,000 pounds of water in a beater and beaten therein for about twenty minutes at room temperature (20° C.). This is a water-cellulose ratio of 20 to 1 but it can be varied over fairly wide limits. The aqueous suspension should not be so thick that beating is difficult. Ratios as low as 15 to 1 are suitable. In this step the process is no different from the ordinary beating process and pulp consistencies are about the same. One of the great advantages in the present process is that most of the processing is handled in the ordinary equipment of a paper mill.

After the preliminary beating just described I then add 4 pounds of unslaked lime and continue the beating for a few minutes to incorporate the lime. The lime does, of course, hydrate in the beater. The amount of lime added can vary up to 8 pounds per 100 pounds of cellulose. For some peculiar reason I find that the hardness of the ultimate gel can be controlled by varying the amount of lime. This shows up in those products made directly from the cellulose gel final product of this stage of my invention, as well as in the "ethylated" products I shall subsequently describe.

I next add hypochlorite of lime to the beater mixture. The amount of hypochlorite is about one mol thereof for each mol of cellulose calculated as $C_6H_{10}O_5$, and beating is continued for about eight minutes longer. During this beating the cellulose reacts with the hypochlorite, and doubtless with the lime present, and the fibrous structure rapidly turns gelatinous. I believe that an oxychloride is formed because only products made in this way will react with unsaturated hydrocarbons and "ethylate." Ordinary oxycellulose made simply by reacting cellulose with bleaching powder will not react with ethylene. Nor will cellulose suspended in the beater react with added hypochlorite and added ethylene. In such cases the end products are found to be ethylene chlorhydrin which will yield ethylene glycol on hydrolysis. The cellulose so treated is not soluble in organic solvents or paraffin hydrocarbons. Nor will oxycellulose made by reacting cellulose with permanganates react with ethylene. Consequently, I am obliged to postulate the formation of a cellulose oxychloride in order to account for the reactivity of the gelled cellulose with hydrocarbons.

After the aforesaid beating period the gelatinous mixture in the beater is passed through a homogenizer to eliminate any remaining fibrous characteristics in the product. Three passes through the homogenizer suffices. Such homogenizer, as is well known, consists of fixed and rotating disks spaced very closely together.

The aqueous mixture is next filtered for the abstraction of most of the aqueous phase, leaving the gelatinous cellulose product behind. This gel can be washed with water several times if desired. It is then dried partially, but not to bone dryness since that would yield a powdered product of no further utility in my invention. Drying is best carried out until the gel has a moisture content of about 22 to 25 percent. The gel is then treated with carbon dioxide gas at room temperature. About 1 to 2 mols of carbon dioxide are used for each mol of cellulose. The carbon dioxide step is important for it imparts hardness to the final molded product, or to products made from the "ethylated" derivative later described. This carbon dioxide treatment is not for the purpose of "neutralizing" any lime present, although there may be some incidental formation of free calcium carbonate if free lime is present. I cannot fully account for the hardening effect of the carbon dioxide except possibly by assuming the formation of a calcium cellulose which may bind the carbon dioxide in some fashion. I do know that the final gel is, at this stage, quite transparent and apparently free of any solid particles of carbonate.

It is this gel which I can then use for directly molding containers for milk, for forming sheets and the like. Or I can add fillers, coloring materials, and resins, such as the glypals, to the gel and mold the mixture.

This end product of this stage in my process is most probably a cellulose oxychloride. That is to say, it contains an —OCl radical in substitution for one of the cellulose hydroxyls. But the chief distinguishing characteristic of the product is that it is chemically reactive with ethylene and other low molecular weight olefins. As stated, I account for this behavior because of the presence of an —OCl group, but I do not wish to be bound by the theory presented. Cellulose is a complex chemical compound. There are many cellulose nitrates and acetates with little or no accurate understanding of the exact chemical structure thereof. Similarly, in the process of this invention the cellulose has undergone profound changes which defy explanation, and I content myself with stating the new physical and chemical properties acquired by the cellulose during the process.

For the purpose of forming sheets and containers directly from the "cellulose oxychloride" gel described above, I find it best to use lime and calcium hypochlorite in the manufacture of the product. This is in part because the lime and carbonation subsequently resorted to, acts to harden the ultimate molded product. Where this hardening action is not required, or where other hardening agents, such as ethyl silicate are used, a similar oxychloride gel can be prepared using caustic soda and sodium hypochlorite, or mixtures of caustic soda and calcium hypochlorite, and using amounts of reagents molecularly equivalent to those given in the detailed example above. For most purposes, however, I prefer to use lime and calcium hypochlorite since both are less expensive than the sodium compounds and the additional hardening feature is in most all instances desirable. I have also found that cellulose oxychloride made with sodium hypochlorite does not resist discoloration as well as when calcium hypochlorite is used.

I shall now describe the second part of the present invention, namely the formation of organic solvent-soluble derivatives made by reacting the above-described "oxychloride gel" with unsaturated hydrocarbons.

One of the great advantages in this stage of the process is that the reaction occurs in water and under atmospheric pressure. Consequently, I re-suspend the gel in water in the beater and pass in ethylene or other reactive unsaturated hydrocarbon. The ratio of water to gel can vary over wide limits but 8 to 1 gives about the right consistency for the introduction of the hydrocarbon. While stirring in the beater the ethylene is slowly introduced in the ratio of about three mols of ethylene to one of cellulose. The reaction is exothermic and the temperature is best maintained at about 20° C. to 35° C. by the speed at which the ethylene is admitted. The ethylated product precipitates and when all the ethylene has been passed in the aqueous mixture is filtered and dried. The water-insoluble precipitate is soluble in many organic solvents, such as ether-alcohol, dioxan, and others. Advantageously the product, after filtration is washed to free it of any chlorine or hydrochloric acid. This cellulose derivative can be admixed with fillers, silica gel, ethyl silicate, ethyl quartzate and coloring materials for heat and pressure molding, or it can be deposited from a solvent in the form of sheets, films and filaments. The ethylated derivative is of uncertain constitution but is possibly a mono-di- or tri-ethyl cellulose glycol ether, together with a very small amount, perhaps three percent of free glycol. Ethylene is the most useful olefin for the reaction but propylene, butylene, and iso-butylene can be used.

During the ethylation complex reactions undoubtedly occur. If the presence of an oxychloride group in the starting gel is probable, as I believe it to be, then the ethylene probably first adds on this OCl group to form a cellulose-substituted ethylene chlorhydrin, namely $C_6H_9O_5$—$OCH_2CH_2Cl$. In the presence of the water the chlorine atom may hydrolyze to form free HCl and substitute an OH group at the end of the ethoxy radical, thus forming a glycolether radical attached to the cellulose. The nascent HCl may in turn react with the excess ethylene present to form ethyl chloride which in turn may react with another cellulose hydroxyl group to ethylate the same and form an ethoxy radical attached to the cellulose carbon. In like manner a further ethoxy group may be introduced into the molecule. It must be admitted that the exact structure of the final solvent-soluble product is not clearly understood but I believe that the foregoing constitutes a reasonable explanation of the probable reactions. I have no better way of defining the product other than by describing it as an ethyl cellulose glycolether, or as the reaction product of the process by which it is made.

Instead of making a partially dried gel of "cellulose oxychloride" and then resuspending this in water I can omit the drying step and directly ethylate the gel with ethylene or other olefin while suspended in the beater. In this modification the initially formed gelatinous mixture resulting from the hypochlorite treatment is homogenized as described above and the homogenized mixture returned to the beater. Carbon dioxide gas is then admitted in the ratio of about one to two mols of carbon dioxide for each mol of cellulose and then ethylene gas is bubbled in until the cellulose derivative precipitates. When this modification is used the concentration of any free calcium hypochlorite present should be below 7% based on the weight of the cellulose. If the hypochlorite content is higher the ethylene will react with the hypochlorite rather than the cellulose oxychloride. When the oxychloride gel is first filtered, as described above, and then returned to the beater it does not contain any free hypochlorite.

I have also discovered that the addition of a small amount of caustic soda, about 1% based on the weight of oxychloride cellulose to the beater during the admission of ethylene catalytically accelerates the "ethylation," pyridine is also useful, but I do not wish to be limited to the addition of any catalyst.

Having thus described my invention, what I claim is:

1. A method which comprises mixing a cellulose of high alpha content with approximately 8% by weight of an alkali metal hydroxide in water, adding a molar equivalent of the cellulose of a hypochlorite to the mixture, agitating the mixture at room temperature until the reaction with the hypochlorite is completed and introducing carbon dioxide into the mixture to form a cellulose oxychloride.

2. A method which comprises mixing a cellulose of high alpha content with approximately 8% by weight of an alkali metal hydroxide in water, adding a molar equivalent of the cellulose of a hypochlorite to the mixture, agitating the mixture at room temperature until the reaction with the hypochlorite is completed, adding an olefin to the mixture in the presence of carbon dioxide to form an alkyl cellulose glycolether.

3. The product resulting from the process of claim 1.

4. The product resulting from the process of claim 2.

5. A method which comprises mixing a cellulose of high alpha content with approximately 8% by weight of calcium hydroxide in water, adding a molar equivalent of the cellulose of a hypochlorite to the mixture, agitating the mixture at room temperature until the reaction with the hypochlorite is completed and introducing carbon dioxide into the mixture to form a cellulose oxychloride.

6. A method which comprises mixing a cellulose of high alpha content with approximately 8% by weight of an alkali metal hydroxide in water, adding a molar equivalent of the cellulose of calcium hypochlorite to the mixture, agitating the mixture at room temperature until the reaction with the hypochlorite is completed and introducing carbon dioxide into the mixture to form a cellulose oxychloride.

7. A method which comprises mixing a cellulose of high alpha content with approximately 8% by weight of calcium hydroxide in water, adding a molar equivalent of the cellulose of calcium hypochlorite to the mixture, agitating the mixture at room temperature until the reaction with the hypochlorite is completed and introducing carbon dioxide into the mixture to form a cellulose oxychloride.

8. A method which comprises mixing a cellulose of high alpha content with approximately 8% by weight of an alkali metal hydroxide in water, adding a molar equivalent of the cellulose of a hypochlorite to the mixture, agitating the mixture at room temperature until the reaction with the hypochlorite is completed, adding ethylene to the mixture in the presence of carbon dioxide to form an alkyl cellulose glycol ether.

9. A method which comprises mixing a cellulose of high alpha content with approximately 8% by weight of an alkali metal hydroxide in water, adding a molar equivalent of the cellulose of a hypochlorite to the mixture, agitating the mixture at room temperature until the reaction with the hypochlorite is completed, adding propylene to the mixture in the presence of carbon dioxide to form an alkyl cellulose glycol ether.

10. A method which comprises mixing a cellulose of high alpha content with approximately 8% by weight of an alkali metal hydroxide in water, adding a molar equivalent of the cellulose of a hypochlorite to the mixture, agitating the mixture at room temperature until the reaction with the hypochlorite is completed, adding isobutylene to the mixture in the presence of carbon dioxide to form an alkyl cellulose glycol ether.

11. A method which comprises mixing a cellulose of high alpha content with approximately 8% by weight of calcium hydroxide in water, adding a molar equivalent of the cellulose of a hypochlorite to the mixture, agitating the mixture at room temperature until the reaction with the hypochlorite is completed, adding an olefin to the mixture in the presence of carbon dioxide to form an alkyl cellulose glycol ether.

12. A method which comprises mixing a cellulose of high alpha content with approximately 8% by weight of an alkali metal hydroxide in water, adding a molar equivalent of the cellulose of calcium hypochlorite to the mixture, agitating the mixture at room temperature until the reaction with the hypochlorite is completed, adding an olefin to the mixture in the presence of carbon dioxide to form an alkyl cellulose glycol ether.

13. A method which comprises mixing a cellulose of high alpha content with approximately 8% by weight of calcium hydroxide in water, adding a molar equivalent of the cellulose of calcium hypochlorite to the mixture, agitating the mixture at room temperature until the reaction with the hypochlorite is completed, adding an olefin to the mixture in the presence of carbon dioxide to form an alkyl cellulose glycol ether.

14. The product resulting from the process of claim 5.

15. The product resulting from the process of claim 6.

16. The product resulting from the process of claim 7.

17. The product resulting from the process of claim 8.

18. The product resulting from the process of claim 9.

19. The product resulting from the process of claim 10.

20. The product resulting from the process of claim 11.

21. The product resulting from the process of claim 12.

22. The product resulting from the process of claim 13.

JOHN A. ROUX.